United States Patent [19]

Riehle

[11] 4,250,642
[45] Feb. 17, 1981

[54] PLANNING AID

[76] Inventor: Harald Riehle, Anna-Schieber-Weg 18, 7300 Esslingen, Fed. Rep. of Germany

[21] Appl. No.: 26,158

[22] Filed: Apr. 2, 1979

Related U.S. Application Data

[63] Continuation-in-part of Ser. No. 800,597, May 25, 1977, abandoned.

[30] Foreign Application Priority Data

Jun. 3, 1976 [DE] Fed. Rep. of Germany ....... 2624960

[51] Int. Cl.$^3$ ............................................. G09F 7/12
[52] U.S. Cl. ........................................ 40/160; 40/594; 434/79; 434/80; 434/150
[58] Field of Search .................... 40/494, 495, 160; 35/7 R, 7 A, 24 R, 24 A, 24 B, 35 H, 73

[56] References Cited

U.S. PATENT DOCUMENTS

| | | | |
|---|---|---|---|
| 2,586,017 | 2/1952 | Freedman | 35/73 UX |
| 3,380,177 | 4/1968 | Wagner | 35/24 R |

FOREIGN PATENT DOCUMENTS 627881 8/1949 United Kingdom ................... 40/595

Primary Examiner—John F. Pitrelli
Attorney, Agent, or Firm—Edwin E. Greigg

[57] ABSTRACT

A planning aid is produced by the use of a transparent foil which is adhesive on one side, thus providing a surface for the adhesion thereto of planning elements and/or symbols having smooth surfaces, the foil being applied to a sheet containing a pictorial representation. The planning elements and/or symbols may themselves be of foil structure or of plastic-coated cardboard or the like. For the purpose of providing a permanent record of the juxtaposition of the planning elements and/or symbols to the pictorial representation, the surface with said elements and/or symbols adhering thereto may be photocopied.

4 Claims, 8 Drawing Figures

PLANNING AID

CROSS REFERENCE TO RELATED APPLICATIONS

This application is a continuation-in-part of my application Ser. No. 800,597, filed May 25, 1977 in Group 334 and which is now abandoned.

BACKGROUND OF THE INVENTION

This invention relates to planning aids and to a method of using such aids.

It is known per se that smooth surfaces, such as for example those formed by flexible soft foils, when pressed against each other, adhere to each other by the adhesive forces which are created between them (German Patent specifications 845 441, 1 286 755, 1 179 095).

In this way, however, it is always only possible to produce "black" boards, to which planning symbols can be applied appropriately. If it is now desired to experiment with the planning symbols on a pictorial representation, e.g. a plan, which may represent the plan view of a building, or with an organization chart, using a variety of arrangements of individual planning elements or symbols, the latter have previously been printed onto a foil which had been made in the form of a planning board. This of course was only possible in those cases in which such a representation which had been printed onto a planning board was used sufficiently frequently to justify the costs of the printing operation. An alternative method consisted in laminating the plan or the organization chart onto a sheet metal plate, so that magnetic planning elements or symbols could then be used. This however is relatively expensive, since planning elements or symbols which are provided with magnets are required.

OBJECT AND SUMMARY OF THE INVENTION

Now the invention is based on the realization that any plan or the like can be arranged as a planning board in the simplest possible way, in that, as hereinbefore discussed, merely a flexible transparent foil which is adhesive on one side is applied to a highly flexible sheet of paper, the surface of which is provided with a layout or design by printing or the like. Then planning elements or symbols, insofar as they each have a smooth rear surface, adhere thereto simply by the application of pressure and are also again readily removable. If, for the purpose of hugging the surfaces, they are too rigid or not sufficiently smooth, the requisite characteristics of the rear sides of these planning elements or symbols can readily be created by simply causing a small strip of a foil which is also adhesive on one side to adhere thereto. The two foils then readily adhere together when they are pressed together, by reason of the adhesive forces created thereby.

Other objects and advantages of the present invention will be more readily apparent from a further consideration of the following detailed description of the drawings illustrating a preferred embodiment of the invention, in which:

DESCRIPTION OF THE PREFERRED EMBODIMENT

Figure 1:
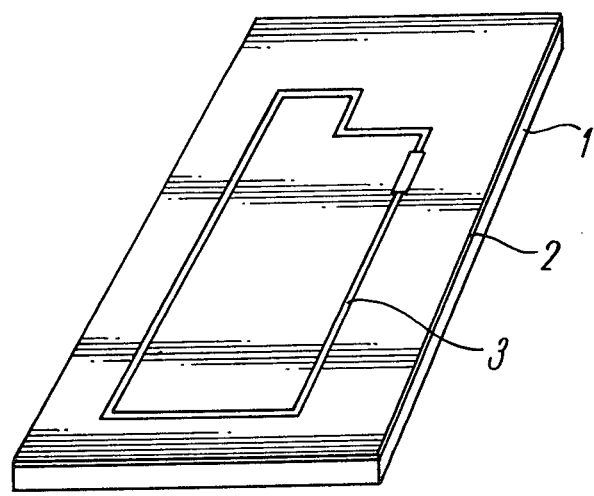
FIG. 1 is a sheet, applied to a substrate and provided with a pictorial representation.
Figure 2:
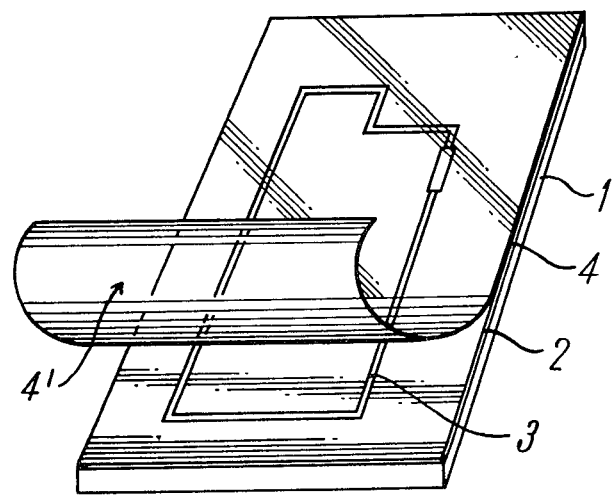
FIG. 2 shows the application of a transparent foil to the sheet.
Figure 3:
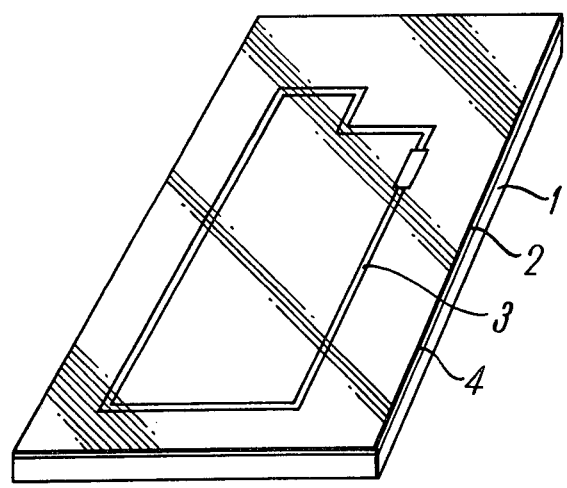
FIG. 3 shows the sheet with the transparent foil applied thereto.
Figure 4:
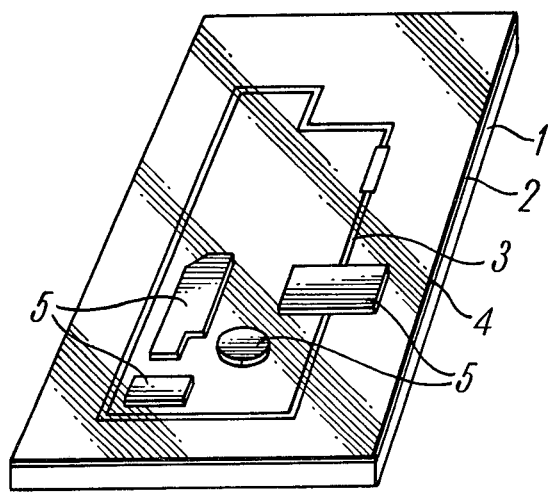
FIG. 4 shows the sheet with the transparent foil applied thereto and with planning elements pressed thereon.

FIG. 1 shows a substrate 1, prior to the application thereto of the foil, to which a detachable and release sheet 2 is stuck in releasable relation. The sheet 2 contains a representation 3 of a plan or the like, in the example a plan view of a hall. Any kind of plans, maps, organization charts and the like may constitute the representation. In accordance with FIG. 2, a transparent foil 4, which is adhesive on one side and adapted to adhere by its underside 4', is applied or "laminated" to the sheet 2. It then adheres to the sheet. The representation 3 is still visible from outside through it. This condition is shown in FIG. 3.

The representation 3 is thus provided with a smooth transparent surface of high quality.

This surface of the representation 3 now has the characteristic—and therein lies the new use, in accordance with the invention, of such transparent foils—that planning elements 5 can adhere thereto in the following circumstances:

Their undersides must be smooth and sufficiently soft to enable them to be pressed against the foil 4 in such a way that adhesive forces can form between the undersides of the planning elements 5 and the top of the foil 4, which effect the adhesion. As can be seen from FIG. 5, this is achieved in the embodiment by also sticking to the undersides of the planning elements 5 a strip of a foil 6, which may if desired be small. Its side 6' which is remote from the planning element 5 is also sufficiently smooth and soft for adhesive forces to be produced when the two surfaces are pressed against each other.

The general requirement is: One or both areas (the surface of the foil 4, the surface of the foil 6') must moreover be sufficiently flexible and soft, to enable both faces to be pressed against each other in such a way that a region of contiguity is created in which the air entirely escapes from the space therebetween and this condition remains in existence.

However, the adhesive forces are such that the planning elements 5 can again readily be removed. Where for example the representation 3 represents the plan of a hall, the planning elements 5 may represent machines or furniture whose optimum arrangement is sought by displacing them. They may, however, where the representation 3 relates to an organization chart or the like, be symbols whose significance has a connection with the representation of the organization chart.

Figure 5:
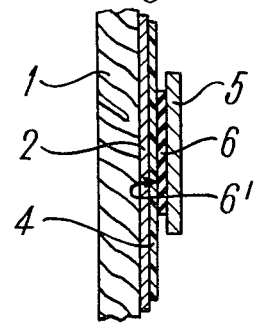
FIG. 5 shows a cross section through a planning element applied to the transparent foil.

In order to develop the adhesive effect, provision must, as has already been mentioned, be made to enable the reverse side of the planning element 5 to hug the front of foil 4 over a certain region. The softer one of the two parts is, the harder the other one of the parts may be. If the planning elements themselves are also of foil structure, they adhere inherently to the surface of the foil 4, even when they are made of a harder material, i.e. a material which is less pliable by comparison with the foil 4. It is also possible to form the planning elements 5 from plastic-coated cardboard pieces, somewhat thicker plastic plates or the like. If the reverse face of the planning elements 5 is not smooth or sufficiently pliable, it suffices to stick also to the reverse side, as shown in FIG. 5, a small strip or the like of a foil which is adhesive on one side. The two foil surfaces then adhere securely and in a simple manner.

The invention can be regarded as the facility with which any plan, map or the like can be converted into a planning board, to which planning symbols adhere in a particularly simple manner, by the simple expedient of lamination by a transparent foil. Any pictorial representation, which is fixed to a sheet of paper or the like in any manner can be converted into a board, to which the symbols or planning elements 5 adhere, by coating it with a foil 4. The plan with the planning elements or symbols adhering thereto can then also be copied and in this way the experimental condition of the configuration of the symbols can be fixed, whereafter further experimentation by means of the planning elements may be proceeded with. In this way the possibility is provided in a particularly simple manner of providing any form of representation fixed on paper in the form of a board, to which planning elements or symbols adhere.

A suitable transparent foil 4 can readily be found by experimenting with the materials which are commercially available.

Figure 6:
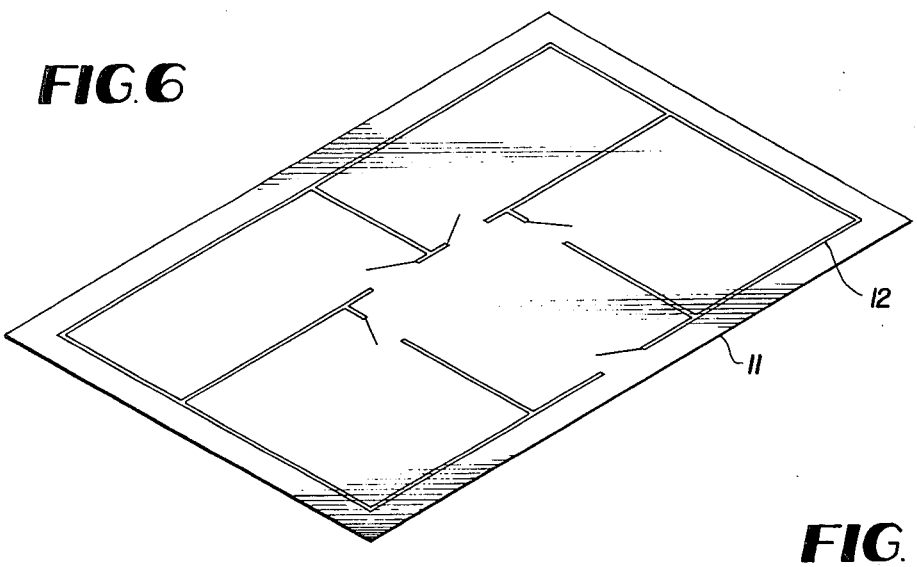
FIG. 6 is a view similar to FIG. 1 of a component part of another embodiment of the invention.
Figure 7:
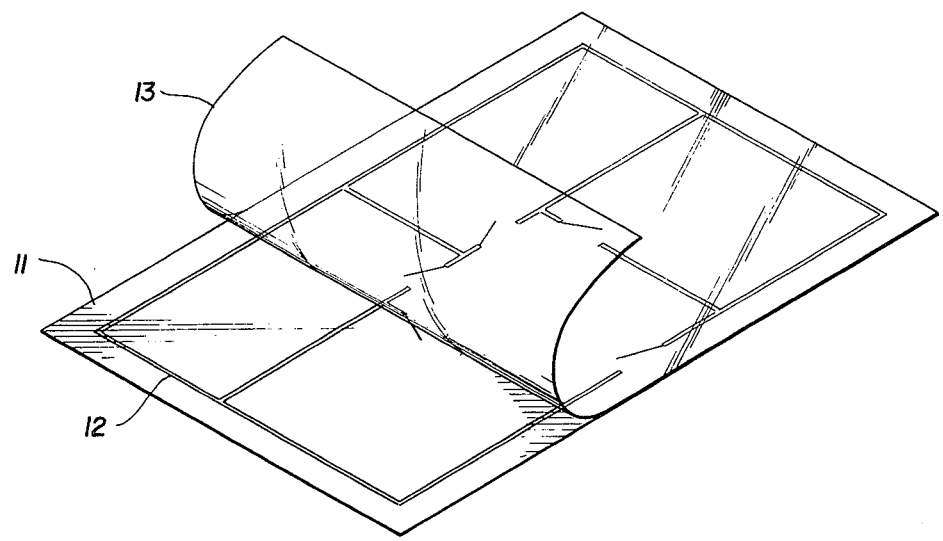
FIG. 7 is a view similar to FIG. 6 of the completed construction of the other embodiment of the invention.
Figure 8:
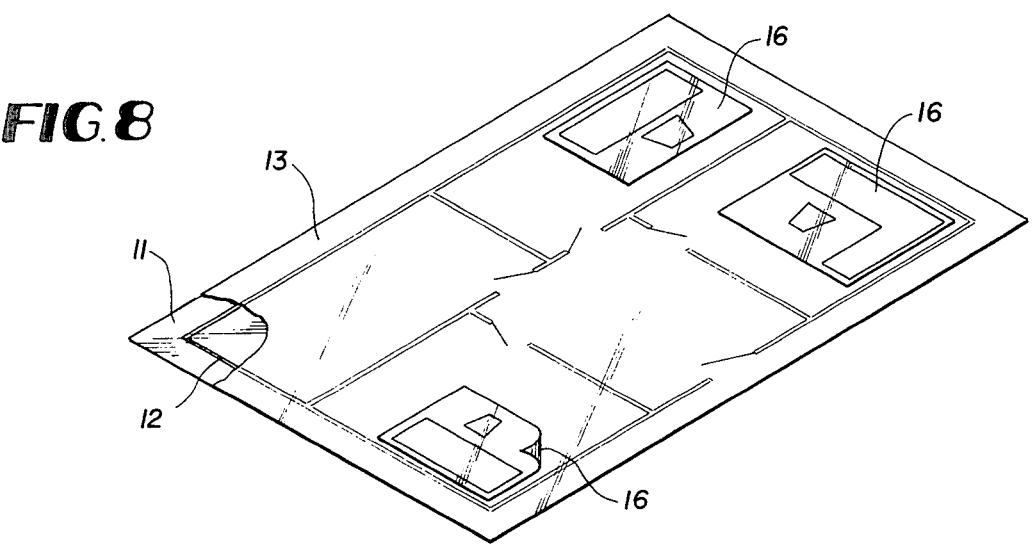
FIG. 8 is a view similar to FIG. 7 of the other embodiment of the invention with planning elements mounted thereon.

Referring now to FIGS. 6-8 and to FIG. 6 in particular, there is shown another embodiment of the invention whereon a sheet of paper 11 is provided on one surface with a plan of representation 12 by means of printing or the like. The plan 12 may be any suitable design such as a layout or floor plan of a factory in which machines, furniture, etc. are to be located in selected positions. The paper sheet 11 may be of any size and of conventional thin form such as stationery paper or the like so as to be highly flexible.

As in the embodiment of FIGS. 1-4, a transparent foil 13 of flexible plastic material is adhesively, releasably and detachably secured in overlying relationship with the paper sheet 11 so that the layout 12 is visible therethrough as shown best in FIG. 8.

Planning elements 16 which represent machines, furniture or the like may then be placed in selected positions on the upper surface of foil 13, as shown best in FIG. 8. The planning elements 16 are of the same material as that of the planning elements 5 in the embodiment of FIGS. 1-4. Thus, planning elements 16 may be formed of flexible foil material such as plastic or the like or may be of cardboard having a strip of foil 6 secured to the underside as shown in FIG. 5. Therefore, adhesion forces are developed between the overlying surface of the transparent foil 13 and the planning elements 16 as discussed above with reference to the embodiment of FIGS. 1-4 and the elements 16 may be readily attached to and detached from the foil 13.

As a result of the highly flexible nature of the assembly of FIG. 8, the assembly is easily put through a blueprint photocopying machine which, as is well known, subjects the material to be blueprinted to considerable bending. As many blueprints of the assembly as desire may be made without disturbing the positioning of the planning elements 16 as adherence of the elements to the foil 13 is substantial and the entire assembly is unaffected by the bending action imposed on the assembly by the blueprint machine.

What is claimed is:

1. A planning aid in the form of an assembly comprising, in combination,
    a sheet of release paper having one surface provided with a pictorial display of an area in which planning objects are to be arranged,
    a flexible soft sheet of transparent plastic material adhesively secured to said one surface of said release paper sheet in overlying relationship with said display and having a smooth upper surface and being adhesively secured to said release paper sheet in a pressure sensitive relation so that said flexible soft sheet may be removed from said release sheet and selectively adhered to another sheet of release paper,
    a plurality of selectably detachably mounted plastic material having a smooth surface for permitting said elements to be detachably and removably mounted in selected positions on said smooth upper surface of said sheet of plastic material within the outline of said display to thereby symbolize objects to be disposed within the outline of said display,
    the smooth adjacent surfaces of said elements and said sheet of plastic material permitting the exclusion of air therebetween for providing adhesion to detachably retain said elements in the selected positions.

2. The assembly of claim 1, including an intermediate element interposed between said foil upper surface and said smooth surface of said planning elements, said intermediate element having a surface juxtaposed to said foil upper surface which is sufficiently smooth and soft for adhesive forces to be produced when said surface of said intermediate element is pressed against said foil upper surface.

3. The assembly of claim 1, wherein at least one of said planning elements is in the form of a piece of plastic-coated cardboard or the like.

4. A method of producing a planning aid in the form of an assembly comprising the steps of,
    providing a sheet of release paper having one surface provided with a pictorial display of an area in which planning objects are to be arranged,
    adhesively securing a flexible soft sheet of transparent plastic material having a smooth upper surface to said one surface of said release paper sheet in overlying relationship with said display and being adhesively secured to said release paper sheet in a pressure sensitive relation so that said flexible soft sheet may be removed from said release sheet and selectively adhered to another sheet of release paper,
    providing a plurality of selectably detachably mounted planning elements of flexible plastic material having a smooth surface and detachably and removably mounting said planning elements in selected positions on said smooth upper surface of said sheet of plastic material within the outline of said display to thereby symbolize objects to be disposed within the outline of said display,
    the smooth adjacent surfaces of said elements and said sheet of plastic material permitting the exclusion of air therebetween for providing adhesion to detachably retain said elements in the selected positions.

* * * * *